United States Patent [19]

Griggs

[11] 4,349,645

[45] Sep. 14, 1982

[54] POWDERED BLEND OF EPOXY RESIN AND ANHYDRIDE CONTAINING HINDERED NITROGEN-CONTAINING COMPOUND

[75] Inventor: Allen L. Griggs, St. Paul, Minn.

[73] Assignee: Minnesota Mining and Manufacturing Company, St. Paul, Minn.

[21] Appl. No.: 290,382

[22] Filed: Aug. 5, 1981

[51] Int. Cl.$^3$ .............................................. C08G 59/68
[52] U.S. Cl. ..................................... 525/120; 525/113; 525/533; 525/934; 252/182; 528/93; 528/94
[58] Field of Search ............... 525/114, 113, 120, 533, 525/934; 528/112, 93, 94; 252/182

[56] References Cited

U.S. PATENT DOCUMENTS

| | | | |
|---|---|---|---|
| 3,269,974 | 8/1966 | Childs | 525/532 X |
| 3,384,610 | 5/1968 | Lee | 528/112 X |
| 3,400,098 | 9/1968 | Parry | 528/112 X |
| 3,477,971 | 11/1969 | Allen et al. | 528/92 X |
| 4,007,299 | 2/1977 | Schülde et al. | 525/533 X |
| 4,009,224 | 2/1977 | Warnken | 525/119 |

*Primary Examiner*—Earl A. Nielsen

[57] ABSTRACT

Protective coating powder comprising a polyglycidyl ether of bisphenol A and trimellitic anhydride has improved shelf stability when it contains a hindered nitrogen-containing compound such as N,N-diethylaniline.

21 Claims, No Drawings

POWDERED BLEND OF EPOXY RESIN AND ANHYDRIDE CONTAINING HINDERED NITROGEN-CONTAINING COMPOUND

TECHNICAL FIELD

The invention concerns free-flowing powders comprising epoxy resin compositions. Upon striking a heated surface, the powders melt, flow and cure to provide decorative and/or protective coatings which can have good electrical insulating properties.

BACKGROUND ART

Powdered epoxy resin compositions are widely used to provide protective coatings. For uses requiring good electrical insulation, aromatic carboxylic acid anhydrides are favored as the curing agents for the epoxy resin. In order to provide reasonably fast curing rates, the epoxy resin and anhydride are usually blended with a catalyst such as an imidazole, tertiary amine, or a metal salt such as stannous octoate. Powders of these catalyzed blends can be stored at ordinary room temperatures but may gradually advance to the point of no longer being usable after a month or two, especially if the temperature goes much above 25° C. for any appreciable portion of the time. Where longer shelf life is required, the catalyst could be omitted, but this would usually result in uneconomically slow curing rates. This problem has been solved by refrigerating the powder, usually at about 5° to 10° C.

Of the anhydrides, trimellitic anhydride is most widely used for electrical insulating uses, being of low cost and providing a more rapid curing of epoxy resins than do other anhydrides. On the other hand, epoxy resin powders employing trimellitic anhydride as the curing agent have been somewhat less shelf-stable than are those which contain other anhydrides, possibly due to its free carboxylic acid group. Trimellitic anhydride is somewhat toxic so that powders containing it should be used only in coating apparatus which has protective controls. U.S. Pat. Nos. 3,269,974 (Childs), 3,384,610 (Lee), 3,400,098 (Parry) and 3,477,971 (Allen et al.) disclose powder comprising a blend of epoxy resin, trimellitic anhydride and, optionally, a catalyst.

U.S. Pat. No. 4,009,224 (Warnken) teaches that coatings of extraordinarily good flexibility can be attained by a blend of epoxy resin, a curing agent, and a copolymer of vinyl acetate and ethylene, but the copolymer tends to reduce shelf-stability, apparently due to free carboxylic acid groups generated upon thermal degradation. Accordingly, refrigeration would be desirable, especially when the curing agent is trimellitic anhydride.

The epoxy resin predominantly used in the aforementioned powdered epoxy resin compositions is a polyglycidyl ether of bisphenol A. It should be high-softening, i.e., have a high Durrans' softening point within the range of 60° to 130° C., preferably within 70° to 110° C. Below 70° C., the powder may tend to sinter during storage unless refrigerated, regardless of the chemical stability of the composition. The Durrans' softening point of the epoxy resin preferably does not exceed 110° C., so as to minimize energy requirements for applying coatings of the powders.

THE PRESENT INVENTION

Although employing low-cost trimellitic anhydride, the epoxy resin powder of the present invention has good shelf-stability and cures as rapidly as do the less stable powders of the prior art which employ trimellitic anhydride. Like those prior powders, the powder of the present invention comprises a blend of a major proportion by weight of a high-softening polyglycidyl ether of bisphenol A, from 50% to 150% of a stoichiometric amount of trimellitic anhydride (based on difunctionality) and a small amount of catalyst. The significant improvement in shelf life is obtained by incorporating in the blend at least one hindered nitrogen-containing compound, which may function as the catalyst and (1) has an aqueous pKa greater than 3.5,
(2) has a boiling point above 125° C., and
(3) is soluble in the polyglycidyl ether of bisphenol A.

By "hindered" is meant that the nitrogen-containing compound passes the Epoxy Homopolymerization Test described below. The hindered nitrogen-containing compound may be effective when used in amounts within the range of 0.1 to 5% of the weight of the polyglycidyl ether. The preferred range is 0.5 to 1.0%, above which a noticeable improvement in shelf life is unlikely and there might be some deterioration in electrical insulating properties of cured coatings. Below 0.5%, there is less improvement in shelf life.

It is believed that the hindering may be either steric or electronic, necessarily steric if the aqueous $pK_a$ of the hindered amine is above about 7, and of a highly effective steric nature if its aqueous $pK_a$ is above about 9. It is theorized that the nitrogen of the hindered nitrogen-containing compound could form an amine salt with any free carboxylic acid group of the carboxylic acid anhydride. When trimellitic anhydride and the polyglycidyl ether are present in stoichiometric amounts and the composition includes a hindered nitrogen-containing compound at a preferred proportion of 0.5% of the weight of the polyglycidyl ether, the hindered compound would provide enough nitrogen to complex only about 5% of the free carboxyl groups of trimellitic anhydride. Hence, some unknown mechanism must be involved.

Even though the hindered nitrogen-containing compound significantly improves the shelf life of the powder, it apparently does not inhibit the rate of cure at usual curing temperatures.

As noted above, epoxy resin powders of the prior art which employ trimellitic anhydride as the curing agent are somewhat less shelf-stable than those which contain other anhydrides. However, when a hindered nitrogen-containing compound which is useful in the present invention was added to epoxy resin powders employing pyromellitic dianhydride or benzophenone-tetracarboxylic acid dianhydride, the shelf-stability was poorer than when the hindered compound was not added. Then when benzoic acid was added in an amount about stoichiometrically equal to the hindered compound, the shelf-stability was as good as before adding the hindered compound. From this, it can be theorized that in the present invention the hindered nitrogen-containing compound is protonated by the free carboxylic acid group of the trimellitic anhydride, thus inhibiting its catalytic nature during storage of the powder.

The hindered nitrogen-containing compound provides surprisingly good shelf-life in epoxy resin powders containing copolymers of vinyl acetate and ethylene. As in the aforementioned Warnken U.S. Pat. No. 4,009,224, useful copolymers comprise by weight 2–50% vinyl acetate and 5–75% ethylene, have a melt index of 5–400, and may be present in amounts up to 30 parts per 100 parts by weight of the polyglycidyl ether.

The hindered nitrogen-containing compound is equally effective in prolonging shelf life whether or not it catalyzes reaction between the polyglycidyl ether and trimellitic anhydride in the molten state. If it does not catalyze that reaction, the blend of the powder must contain an agent for catalyzing that reaction. Even if the hindered nitrogen-containing compound does catalyze that reaction, it is preferred also to employ an agent which both catalyzes epoxy-carboxyl reactions and epoxy-epoxy reactions, because this provides greater assurance that all of the starting material enters the reaction. Especially useful as added catalytic agents are imidazoles, catalytic tertiary amines, and metal salts. Both catalytic tertiary amines and metal salts initiate rapid curing at moderately elevated temperatures such as 120° to 150° C. The hindered nitrogen-containing compounds have been highly effective in providing good shelf stability at ordinary room temperatures for powders employing those three classes of catalytic agents.

Preferred hindered nitrogen-containing compounds include tertiary amines of the formula

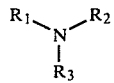

where $R_1$ and $R_2$ are aliphatic and $R_3$ is either aromatic, aliphatic or cycloaliphatic. Preferred hindered tertiary amines of that formula are N,N-diethylaniline and N,N-dimethyl-2-methylaniline (also called N,N-dimethyl-o-toluidine), both being of low cost and readily available. The aqueous $pK_a$ of a hindered tertiary amine containing two aromatic groups is usually less than 3.5.

Useful hindered nitrogen-containing compounds which are secondary amines and have the other three qualities enumerated above include diisobutylamine and di-t-butylamine.

Other useful hindered nitrogen-containing compounds are heterocycles of the formula

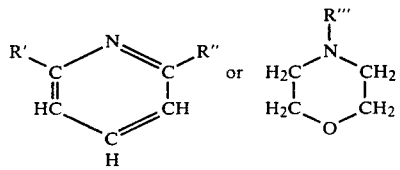

wherein each of R' and R" is lower alkyl and R''' is lower alkyl other than methyl. Preferred hindered nitrogen-containing heterocycles are 2,6-dimethylpyridine (also called 2,6-lutidine) and N-ethylmorpholine.

The hindered nitrogen-containing compound should be useful as a salt, e.g., a salt of benzoic acid.

The polyglycidyl ether, trimellitic anhydride, hindered nitrogen-containing compound, and additional catalyst, if any, may be blended batchwise using a 2-roll rubber mill or continuously using a melt-mixing extruder as is well known in the art. When using an extruder, the mixture is subjected to the melt temperature for a few seconds during mixing and is immediately chilled, as by feeding onto a chill roll. When using a rubber mill, the temperature of the mixture is maintained at the minimum needed to soften the polyglycidyl ether sufficiently to obtain a good blend, preferably well below the melting point of the anhydride. The hindered nitrogen-containing compound may be added at the same time as the anhydride. However, experiments to date suggest that longer shelf life can be attained by dissolving the hindered nitrogen-containing compound into molten polyglycidyl ether, preferably at the final stage of its manufacture and in any event before the addition of any curing agent.

If the aqueous pKa of the hindered nitrogen-containing compound is either below 5 or above 9 and it is dissolved into molten polyglycidyl ether in an amount providing 0.5 of the weight of the polyglycidyl ether, the polyglycidyl ether might set up in the kettle. There is less need for concern if its pKa is between 5 and 9 unless the hindered nitrogen-containing compound is only marginally hindered, and hence catalytically active. Because ethyl substituents provide more effective hindering than do methyl, they are preferred where the hindered nitrogen-containing compound is to be dissolved into molten polyglycidyl ether. In anilines, ortho substitution is preferred for the same reason, in which event $R_1$ and $R_2$ may both be methyl.

Certain fillers such as titanium dioxide and amorphous silica significantly improve the coating coverage and thereby enhance the electrical insulating quality of cured coatings of the powdered blends of polyglycidyl ether and anhydride. They may also have a reinforcing effect. The resin powder of the invention may also contain ingredients which interact with the polyglycidyl ether and anhydride such as monoglycidyl compounds and/or acrylates and methacrylates such as are disclosed in U.S. Pat. No. 4,065,518. Such interactive ingredients should be restricted to amounts that produce no detrimental change either in shelf life or in quality of cured coatings. The amounts of such interactive additives should be so restricted that the high-softening polyglycidyl ether comprises a major proportion by weight of all interactive ingredients of the powder.

Whether or not a nitrogen-containing compound is "hindered" is determined by the following test:

Epoxy Homopolymerization Test 47.5 parts of polyglycidyl ether of bisphenol A having a Durrans' softening point of about 9° C. (e.g., "Epon" 828) and 2.5 parts of the nitrogen-containing compound to be tested are vigorously stirred together for one minute at room temperature. A 16 × 150 mm test tube is half filled with the mixture. Immediately after placing the test tube in a 100° C. constant-temperature bath, the viscosity is monitored using a Brookfield viscometer Model LVT, No. 4 spindle, 6 r.p.m. The nitrogen-containing compound is adjudged to be hindered if the viscosity at 100° C. is less than 100,000 cps. after one hour.

Some hindered nitrogen-containing compounds which are believed to be useful in the present invention are listed in the following table. Each has a boiling point above 125° C. and is soluble in polyglycidyl ether.

| Hindered nitrogen-containing compounds | Aqueous pK$_a$ (25° C.) | Epoxy Homopolymerization Test |
| --- | --- | --- |
| 1,8-bis(dimethylamino)naphthalene | 12.34 | <1000 cps |
| diisobutylamine | 10.91 | <1000 cps |
| N,N-diethylcyclohexylamine | >10 | <1000 cps |
| tributylamine | >10 | <1000 cps |
| tripropylamine | >10 | NT |

-continued

| Hindered nitrogen-containing compounds | Aqueous pK$_a$ (25° C.) | Epoxy Homopolymerization Test |
|---|---|---|
| N,N,N',N'-tetraethylethylenediamine | 9.67 | NT |
| N,N-diisopropylaniline | 8.14 | NT |
| N-t-butyl-N-ethylaniline | 8.02 | NT |
| N-isobutylmorpholine | 7.82 | NT |
| N-pentylmorpholine | 7.69 | NT |
| N-ethylmorpholine | 7.67 | NT |
| 2,4,6-trimethylpyridine | 7.25–7.4 | <1000 cps |
| N,N-di-n-propylaniline | 7.37 | NT |
| N,N-diethyl-2-methylaniline | 7.18–7.24 | NT |
| N,N-diethyl-4-methylaniline | 7.03 | NT |
| N,N-bis(2-chloroethyl)ethylamine | 6.78 | NT |
| N,N-diethyl-3-methylaniline | 6.7 | NT |
| N,N-diethylaniline | 6.52–6.6 | <1000 cps |
| N-ethyl-N-propylaniline | 6.39,6.4 | NT |
| N-cyclohexyl-N-methylaniline | 6.35 | NT |
| N,N-dibutylaniline | 6.30 | NT |
| N-ethyl-N-methylaniline | 6.07 | NT |
| α-picoline | 5.92–6.02 | NT |
| N,N-dimethyl-4-methoxyaniline | 5.85 | NT |
| N,N-dimethyl-2-methylaniline | 5.85 | <1000 cps |
| N,N-diethyl-4-bromoaniline | 5.81 | NT |
| 2,6-dimethylpyridine | 5.77,6.6 | NT |
| β-picoline | 5.68 | NT |
| acridine | 5.5 | NT |
| N,N-dimethyl-3-methylaniline | 5.22 | NT |
| N,N-dimethylaniline | 5.07–5.21 | <1000 cps |
| Quinoline | 4.9 | NT |
| N,N-dimethyl-2,4,6-trimethylaniline | 4.84 | NT |
| N,N-dimethyl-4-methylaniline | 4.76,7.24 | NT |
| N,N-dimethyl-2,6-dimethylaniline | 4.62 | NT |
| N,N-dimethyl-4-nitrosoaniline | 4.54 | NT |
| N,N-bis(2-chloroethyl)aminoethylbenzene | 4.45 | NT |
| 2,3,8-trimethylquinoline | 4.42 | NT |
| N,N-dimethyl-4-chloroaniline | 4.395 | NT |
| N,N-dimethyl-2,6-dimethyl-4-bromoaniline | 4.36 | NT |
| N,N-dimethyl-4-bromoaniline | 4.23–4.25 | NT |
| N,N-di-n-propyl-4-nitrosoaniline | 4.17 | NT |
| N,N-bis(2-chloroethyl)benzylamine | 4.15 | NT |
| 2,6-di-t-butyl-3-sulfopyridine | 4.12 | NT |
| N,N-diethyl-4-nitrosaniline | 4.11 | NT |
| N,N-dimethyl-3-chloroaniline | 3.84 | NT |
| 4-chloropyridine | 3.83 | NT |
| 4-bromopyridine | 3.75 | NT |
| 2,6-di-t-butylpyridine | 3.58,5.02 | NT |

NT = Not Tested

The following nitrogen-containing compounds are not hindered, and thus are not useful in the present invention. Each failed the Epoxy Homopolymerization Test even though having an aqueous pK$_a$ above 3.5 and a boiling point above 125° C. and being soluble in polyglycidyl ether:

2,4,6-tris(dimethylaminomethyl)phenol
N,N-dimethylbenzylamine
Nicotine
N,N,N',N'-tetramethylethylenediamine
2-methylimidazole.

When they have been used at 0.5 to 1.0% of the weight of the polyglycidyl ether to make powders comparable to those of the present invention, the powders have tended to gel so quickly as to provide poor coating coverage.

One hindered nitrogen-containing compound has been found which is not effective in the present invention even though it has the other three qualities enumerated above, namely, triethanolamine. It is believed that its three primary hydroxyl groups are reactive with epoxy groups, thus negating any stabilizing effect.

Polyglycidyl ethers of bisphenol A which have proven to be effective in the practice of the invention include

Epoxy Resin A

Bisphenol A and diglycidyl ether of bisphenol A were inter-reacted to provide a solid epoxy resin having a Durrans' softening point of about 85° C. and an epoxide equivalent weight of about 550. Such a resin is commercially available as "EpiRez" 5223 from Celanese Resins Division.

Epoxy Resin B

Bisphenol A and diglycidyl ether of bisphenol A were inter-reacted to provide a solid epoxy resin having a Durrans' softening point of about 100° C. and an epoxide equivalent weight of about 900. Added prior to the reaction were 5 parts (per hundred parts by weight of resin) of a copolymer of 60 parts of ethylene and 40 parts by weight of vinyl acetate having a melt index of 45–70 (obtained from E. I. du Pont de Nemours & Co. as "Elvax" 40). Stirred into the molten reaction product was 0.7 part by weight of a flow-control agent, polymerized ethyl acrylate/2-ethylhexyl acrylate (sold as "Modaflow" by Monsanto Chemical Co.).

Spray Test

Using a clean steel panel which has been preheated to 240° C., a resin powder is sprayed onto the panel to a thickness to provide a cured coating about 0.25 mm in thickness. After the resin fuses and sets, the steel panel is cooled, and the surface of the coating is examined and categorized. The resin powder is adjudged "uncoatable" if only a minor proportion has adhered to the panel; "infusible" if a major proportion has adhered but did not flow sufficiently to provide a continuous coating; "rough" if it has provided a continuous, but rough, coating; and "smooth" if the surface of the coating is generally flat and glossy.

Pillflow Test 0.9 g of resin powder is pressed into a disc or pill 12.5 mm in diameter. The pill is placed upon a smooth glass plate located horizontally in an oven which is maintained at 150° C. After 35 seconds, the panel is tilted to an angle of 63° to the horizontal. The pill should melt and flow until curing to the point at which the flow ceases. The overall length of the pill after flowing is called "pillflow." If the powder has become appreciably cured during storage, its pillflow will be much less than it was when freshly prepared. A pillflow of 12.5 mm would indicate zero flow and that the powder has become infusible during storage.

In the following examples, all parts are given by weight:

EXAMPLES 1–3

Examples 1–3 and Comparative Example C-1 employed blends of Epoxy Resin A and trimellitic anhydride. In making each, Epoxy Resin A was banded on a rubber mill with its hot roll at 83° C. In making up Example 1, a hindered nitrogen-containing compound, N,N-diethylaniline, was added to the banded Epoxy Resin A along with the other components except that the trimellitic anhydride was added after the other ingredients had been blended for about six minutes. Four minutes after adding the anhydride, the milled batch was sheeted off, quickly cooled and subsequently pulverized.

In Example 2, the hindered nitrogen-containing compound was dissolved into the molten Epoxy Resin A at the final stage of its manufacture. In Example 3, equal parts of the thus-modified Epoxy Resin A and unmodified Epoxy Resin A were blended together before being blended with the other components.

|  | Grams | | | |
| --- | --- | --- | --- | --- |
| Example | 1 | C-1 | 2 | 3 |
| Epoxy resin | 1143 | 1154 | 1143 | 1148 |
| N,N-diethylaniline | 11.5 | — | 11.5 | 5.75 |
| Trimellitic anhydride | 138.6 | 138.6 | 138.6 | 138.6 |
| 2-methylimidazole catalyst | 0.44 | 0.44 | 0.44 | 0.44 |
| Flow control agent ("Modaflow") | 14.2 | 14.2 | 14.2 | 14.2 |
| Blue pigment | 10 | 10 | 10 | 10 |
| $TiO_2$ (rutile form) | 850 | 850 | 850 | 850 |

The pillflow of the powder of Comparative Example C-1 dropped from 31 mm to 21 mm after about 31 days at 29° C. so that the powder was considered to be no longer useful. The pillflow of the powder of Example 1, which initially was 35 mm, did not drop to 21 mm until about 57 days, while the pillflow of each of the powders of Examples 2 and 3 was still well above 21 mm at 70 days, at which point the test was discontinued.

When used while their pillflow was still above 21 mm, the powders of each of Examples 1–3 and Comparative Example C-1 provided good protective coatings having excellent electrical insulating values, as follows:

|  |  | Values for Examples | | | |
| --- | --- | --- | --- | --- | --- |
|  | Conditions | 1 | C-1 | 2 | 3 |
| Dissipation Factor | 100 Hz 23° C. | 0.008 | 0.010 | 0.011 | 0.010 |
|  | 100 Hz, 100° C. | 0.028 | 0.028 | 0.035 | 0.026 |
| Dielectric Constant | 100 HZ, 23°C. | 6.98 | 6.53 | 6.26 | 6.63 |
|  | 100 Hz, 100° C. | 5.55 | 5.38 | 5.47 | 4.98 |
| Volume Resistivity (times $10^{15}$ ohm-cm) | 23° C., 50% RH | 3.3 | 1.5 | 2.5 | 0.71 |
| (thickness in mils) |  | (11.4) | (11.7) | (7.7) | (7.7) |
| Dielectric Strength (volts per mil) | 500 volts/sec | 930 | 650 | 800 | 840 |

The above measurements were made under ASTM Test Methods D-150 (for Dissipation Factor and Dielectric Constant), D-257 (for Volume Resistivity), and D-149 (for Dielectric Strength using ¼-inch electrodes).

EXAMPLES 4–5

The powders of Examples 4 and 5 were prepared in the same manner as in Example 2 except each used a different hindered nitrogen-containing compound, in each case one part per 100 parts of Epoxy Resin B. Example C-4 was also prepared in the same manner except having no hindered nitrogen-containing compound. In making each, 140 g of Epoxy Resin B was banded on a rubber mill with the hot roll at 84° C. After premixing 20 g of silica powder (99.5% passes 325 mesh, 44-micrometer openings), 2.5 g of titanium dioxide powder (anatase form) and 2.5 g of brown $Fe_2O_3$, half of the premix was added to the mill. One gram of stannous octoate was added followed by the remainder of the premix over a 3-minute period. 14.5 g of trimellitic anhydride was added, and three minutes later the blend was stripped from the mill and allowed to cool.

As soon as cooled, the blend was pulverized to provide a powder, 99% of which would pass 80 mesh (177-micrometer openings). Each of the resultant resin powders was subjected to accelerated aging at 42° C. and periodically removed for the Spray Test with the following results:

| Example | C-4 | 4 | 5 |
| --- | --- | --- | --- |
| Hindered nitrogen containing compound | none | N,N-dimethylaniline | 2,6-lutidine |
| Storage Time at 42° C. | | | |
| 6 days | smooth | smooth | smooth |
| 14 days | smooth | smooth | smooth |
| 21 days | infusible | smooth | smooth |
| 28 days |  | smooth | smooth |
| 49 days |  | smooth | smooth |

Testing was discontinued after 49 days.

Portions of the powders of Examples 4 and 5 were sprayed onto clean steel panels of ½-inch (1.3 cm) thickness which had been preheated to 205° C. and were then suspended in an air-circulating oven at 205° C. for 10 minutes to provide cured protective coatings about 0.25 mm. in thickness. After cooling to room temperature, a hole of 3.2 mm diameter was drilled at the center of each coated panel to a depth of about 1.6 mm. A plastic cylinder having a diameter of 4 inches (10 cm) was adhered to the coating of the panel to form a watertight, electrical-insulating seal with the drilled hole at the center. The cylinder was then filled with water containing 1% sodium sulfate, 1% sodium chloride and 1% sodium carbonate. A 1.5-volt direct current was passed through the solution with the positive connected to a platinum anode suspended in the solution and the negative connected to the steel panel. After 90 days, the resin coating of Example 4 had disbonded to a diameter of 31–32 mm at the hole. This test shows that the cured coating of Example 4 was well bonded to the steel and was satisfactorily resistant to disbondment in an adverse environment. The cured coating of Example 5 was completely disbonded.

I claim:

1. Powder useful for applying protective coatings comprising a blend of (a) a major proportion by weight of polyglycidyl ether of bisphenol A having a Durrans' softening point between 60° and 130° C., (b) between 50% and 150% of a stoichiometric amount of trimellitic anhydride, and (c) a small amount of catalyst, wherein the improvement comprises:

the blend contains by weight of the polyglycidyl ether 0.1 to 5% of at least one hindered nitrogen-containing compound which
    (1) has an aqueous pKa greater than 3.5,
    (2) has a boiling point above 125° C., and
    (3) is soluble in the polyglycidyl ether.

2. Powder as defined in claim 1 wherein the improvement comprises:

the hindered nitrogen-containing compound is a hindered tertiary amine of the formula

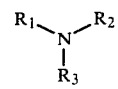

wherein $R_1$ and $R_2$ are aliphatic and $R_3$ is aromatic, aliphatic or cycloaliphatic.

3. Powder as defined in claim 2 wherein the improvement comprises:
the hindered tertiary amine is N,N-diethylaniline.

4. Powder as defined in claim 1 wherein the improvement comprises:
the hindered nitrogen-containing compound is a heterocycle of the formula

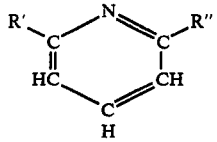

wherein each of R' and R" is lower alkyl.

5. Powder as defined in claim 4 wherein the improvement comprises:
the heterocycle is 2,6-dimethyl pyridine.

6. Powder as defined in claim 1 wherein the improvement comprises:
the hindered nitrogen-containing compound catalyzes the epoxy-anhydride reaction and is the sole catalyst of the blend.

7. Powder as defined in claim 1 wherein the improvement comprises:
the blend also contains an unhindered catalytic tertiary amine.

8. Powder as defined in claim 1 wherein the improvement comprises:
the blend also contains a metal salt catalyst.

9. Powder as defined in claim 1 wherein the improvement comprises:
the blend also contains an imidazole catalyst.

10. Powder as defined in claim 1 wherein the improvement comprises:
the blend also contains a copolymer of vinyl acetate and ethylene.

11. Powder as defined in claim 1 wherein the improvement comprises:
the weight of the hindered nitrogen-containing compound is 0.5 to 1% by weight of the polyglycidyl ether.

12. Powder as defined in claim 1 wherein the improvement comprises:
the $pK_a$ of the hindered nitrogen-containing compound is within the range of 5 to 9.

13. Powder as defined in claim 1 wherein the improvement comprises:
the hindered nitrogen-containing compound is dissolved into the polyglycidyl ether.

14. Method of making a powder useful for applying protective coatings comprising the steps of
(1) blending (a) a major proportion by weight of polyglycidyl ether of bisphenol A having a Durrans' softening point of 60° to 130° C., (b) trimellitic anhydride, and (c) a catalyst, and
(2) pulverizing the blend to provide a powder, wherein the improvement comprises:
including in the blend by weight of the polyglycidyl ether 0.1 to 5% of at least one hindered nitrogen-containing compound which
(1) has an aqueous $pK_a$ greater than 3.5,
(2) has a boiling point above 125° C., and
(3) is soluble in the polyglycidyl ether.

15. Method of making powder as defined in claim 14 wherein the hindered nitrogen-containing compound is dissolved into the polyglycidyl ether before blending it with the trimellitic anhydride.

16. Polyglycidyl ether of bisphenol A having a Durran's softening point between 60° and 130° C., containing no curing agent, and having dissolved therein 0.1 to 5% of its weight of at least one hindered nitrogen-containing compound which has
(1) an aqueous pKa greater than 3.5 and
(2) a boiling point above 125° C.

17. Polyglycidyl ether as defined in claim 16 wherein the amount of the hindered nitrogen-containing compound is 0.5 to 1.0% of the weight of the polyglycidyl ether.

18. Polyglycidyl ether as defined in claim 17 wherein the pKa of the hindered nitrogen-containing compound is betwen 5 and 9.

19. Polyglycidyl ether as defined in claim 18 wherein the nitrogen-containing compound is a hindered tertiary amine of the formula

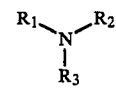

wherein $R_1$ and $R_2$ are aliphatic and $R_3$ is aromatic, aliphatic or cycloaliphatic.

20. Polyglycidyl ether as defined in claim 18 wherein the nitrogen-containing compound is a heterocycle of the formula

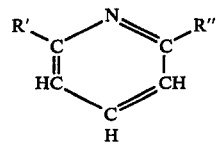

wherein each of R' and R" is lower alkyl.

21. Polyglycidyl ether as defined in claim 16 having blended therewith a copolymer of vinyl acetate and ethylene in an amount up to 30 parts by weight of the polyglycidyl ether.

* * * * *